(12) United States Patent
Adhikari

(10) Patent No.: US 9,998,848 B2
(45) Date of Patent: Jun. 12, 2018

(54) SYSTEM AND METHOD FOR MAKING A QUICK CONNECTION BETWEEN A SMART MOBILE DEVICE AND EXTERNAL AUDIO SPEAKERS AND VIDEO MONITORS USING A CONNECTOR PAD

(71) Applicant: Abhishek Adhikari, Lake Forest, IL (US)

(72) Inventor: Abhishek Adhikari, Lake Forest, IL (US)

( * ) Notice: Subject to any disclaimer, the term of this patent is extended or adjusted under 35 U.S.C. 154(b) by 0 days. days.

(21) Appl. No.: 14/940,256

(22) Filed: Nov. 13, 2015

(65) Prior Publication Data

US 2017/0180915 A1    Jun. 22, 2017

Related U.S. Application Data

(60) Provisional application No. 62/080,314, filed on Nov. 15, 2014.

(51) Int. Cl.
| | |
|---|---|
| *H04B 5/00* | (2006.01) |
| *H04W 4/00* | (2018.01) |
| *H04B 7/00* | (2006.01) |
| *H04W 84/12* | (2009.01) |

(52) U.S. Cl.
CPC .......... *H04W 4/008* (2013.01); *H04B 5/0031* (2013.01); *H04W 84/12* (2013.01)

(58) Field of Classification Search
CPC .............. H04B 5/0031; H04M 1/7253; H04M 2250/02; H04R 2420/07; H04W 4/008
USPC ................................................ 455/41.1–41.3
See application file for complete search history.

(56) References Cited

U.S. PATENT DOCUMENTS

| | | | | |
|---|---|---|---|---|
| 2009/0298420 | A1* | 12/2009 | Haartsen ............... | H04J 3/0658 455/3.06 |
| 2011/0271308 | A1* | 11/2011 | Igoe ..................... | H04L 12/2838 725/81 |
| 2012/0324047 | A1* | 12/2012 | Diner .................... | H04L 65/403 709/217 |

* cited by examiner

*Primary Examiner* — Ayodeji Ayotunde
(74) *Attorney, Agent, or Firm* — Wood, Phillips, Katz, Clark & Mortimer

(57) ABSTRACT

A method and system for easy and quick wireless connection of mobile devices to audio speakers and video systems, like television, using any of NFC, Wi-Fi, and Bluetooth technology. An NFC case offers an easy way to connect a legacy mobile device to a Connector Pad, where NFC is not built-into a device. The Connector Pad is small device and fits perfectly in the palm of the hand. The Connector Pad enables a quick connectivity to audio speakers and television, and it manages the performance and makes sure rules set for privacy and re-connection for uninterrupted listening and playing are made effective. An available App on Android or iOS devices offers added features to remotely control sound quality, toggle between phone calls and music, manage playlists, etc. The phone may stream music or video from a cellular network or from its own storage.

20 Claims, 8 Drawing Sheets

SYSTEM AND METHOD FOR MAKING A QUICK CONNECTION BETWEEN A SMART MOBILE DEVICE AND EXTERNAL AUDIO SPEAKERS AND VIDEO MONITORS USING A CONNECTOR PAD

FIELD OF THE INVENTION

The present invention relates to a system and method for conveniently making and maintaining a quick wireless connection between a mobile electronic device, such as a smart phone or tablet computer, and one or a set of multiple remote audio speakers and/or video monitors and televisions in a room, automobile or other transportation vehicle, or any nearby space for audio listening and video watching. For audio listening, the system converts the speakers into an enhanced speaker phone for audio-conferencing and the like. Similarly, video monitors can be connected with smart devices to use for video-conferencing.

BACKGROUND OF THE ART

Traditionally, audio speakers and video systems are connected to their music and video sources by cables and wires. Those have worked well; but unfortunately the need for multiple cables and plugs and wires made the connections messy at best. Later on, docking stations were developed and used for iPods® and the like, but such stations are being phased out due to rapid changing of device designs, country specific adapters, and evolving input-output configurations. For video, due to higher speed and increased band width requirements, no easy wireless option presently exists.

More recently, Bluetooth® speakers have been introduced. Using the Bluetooth technology, a mobile phone or other mobile device for playing music connects wirelessly with a Bluetooth speaker system.

Unfortunately, wireless connectivity can be tricky to use and maintain. Setup and initial configuration times are long. Depending on network signal strength and device access memory, sometimes the communication is repeatedly disrupted and has to be restarted, going through the same long procedure all over again, causing great annoyance.

With Bluetooth, before the connection is successfully established, the devices need to be "paired" or linked together electronically. If other Bluetooth devices are present in the area, the process of device discovery, pairing, and authentication becomes time consuming. For security seasons, sometimes a system will need a password for authentication before a connection is allowed. If another device previously was most recently paired with the speaker, the information in the device memory may need to be erased, overwritten, or deactivated before the new device can be used; this involves an additional manual step, called "forget device", to be undertaken. A person may just give up the effort and do something else. More specifically, to connect to the Bluetooth-enabled speaker, one needs simultaneously to manipulate the controls (mostly on the device) of both the speaker unit and the mobile device to enable use of the speakers with the source device. Which means he or she has to get up from the comfort of the sofa to go through the re-connect procedure.

Also, since the Bluetooth system has a low band width, it cannot support video playing, even with a large amount of video data compression. Typical Bluetooth systems can handle data in the range of 1-3 Mbits/second; however even a simple, black and white, 24 frame video can requite in excess of 7 Mbits/second of bandwidth.

The present invention offers an alternative method of connecting a user's mobile phone or tablet device to Bluetooth-enabled audio speakers and even to a Bluetooth enabled video monitor or television set with an easy, hassle-free tap on what we call a Connector Pad. A single "tap" of the phone or tablet on the Connector Pad triggers a standard algorithm and chains of internal automated commands and interactive device authentication protocols, for promptly playing one's favorite music or video without additional human intervention. The speaker and the television can be used for audio-conferencing and video-conferencing as well. The speakers and video monitor can be placed away from the listener or viewer, and the system is completely hands-free to connect and control. The new method and system also offer easy and automated reconnection if for any reason the network connectivity is lost.

The system of the invention can involve any of three types of wireless technologies. These are (i) Near Field Communication (NFC), (ii) Bluetooth®, and (iii) Wi-Fi. NFC works on the principle of communicating information over radio waves for only very short distances. Due to its short range, Near Field Communication uses very low power; and the connection is made very quickly. This technology uses principles of electromagnetic induction for data transfer; so actual contact or wired electrical connection between devices is not needed.

Bluetooth, on the other hand, exchanges data over slightly longer distances, also using radio waves. Both RFC and Bluetooth technologies operate in the unlicensed industrial, scientific, and medical (ISM) bands and have been universally accepted by all major manufacturers of mobile devices. However, the data rate, bandwidth, and power ratings are still quite low, so as to allows a long battery life. The Bluetooth technology can serve as a communication protocol agent for switching and authentication. It also transmits audio data.

Wi-Fi is the third wireless technology used here, for any of three main reasons. 1. For video playing, Wi-Fi allows a much larger bandwidth, and so can adequately transmit video. 2. Wi-Fi is also needed for firmware- and features-updates on the Connector Pad. This allows the device to stay current and safe from a security standpoint. 3. Wi-Fi is used to download music and video files from and to a data disk; which is a temporary storage for music or video for those times where there is no mobile phone or tablet available. The Connector Pad along with optional accessories that include a hi-fidelity mini-speaker, a video display panel, battery pack, and memory storage packs offer a stand-alone mini-entertainment system for those occasions, like camping, air travel, or other outdoor activities where no other devices and normal wireless connectivity are available.

SUMMARY OF THE INVENTION

Two different versions are separately discussed.
 i. Audio version, and
 ii. Video version (includes Audio).
i. Summary Description of the Audio Version.

An objective of the present invention is to offer the user a very easy and quick way to connect a mobile device as 10 or 12 in FIG. 1 to a fixed audio system for listening to music and other activities. The audio source may reside in the user's smart phone or tablet, or music may be streamed over a standard wireless network connected through the Internet. Instead of connecting with wires or going through the conventional Bluetooth pairing process, which takes time and can sometimes be quite frustrating, this invention uses a go-between device, using a small pad, called a Connector Pad, which is envisioned to be roughly the size that can be held in the palm of ones's hand. The mobile device 10, if NFC capable, will communicate with the pad when it comes within the range of the pad, giving the pad the needed authentication details. The pad, using Bluetooth or similar technology, then connects to the audio speakers, providing only that they are powered on. This connection in turn immediately triggers the Bluetooth function of the phone or mobile device to communicate with the audio speaker. This gets the music going; and the Connector Pad steps back and goes into either a "sleep" mode or a "monitor and surveillance" mode.

This product system has three component parts:

1. A Case 14, for any non-NFC enabled device,
2. A Connector Pad 16, and
3. A remote speaker or two 18.

A mobile device application (App) can control the speaker output characteristics, as base, treble, fade, balance, statistics, playlist, etc.

A protective cover or adapter case or adapter case 14, if necessary, adds NFC capability to a mobile device. The output from the mobile device is transmitted wirelessly using NFC technology. Selected brands and models may be made available as part of this system, as Android models or iPhone models that do not have NFC capability, or those that do not allow third party NFC access. Once all makers of mobile phones and devices incorporate NFC capability, the case would no longer be required, so long as the OEMs allow third parties to use their NFC connectivity feature. The case 14 would also be nicely designed and styled for aesthetic and ergonomic appeal. The case may preferably be made of a non-metallic plastic material to eliminate any radio frequency interference or shielding.

Once the case is attached to the mobile device, the phone immediately acquires the NFC capability to connect to the wireless pad part of the system, the Connector Pad. A diagrammatic sketch of the Device 10 or 12 is shown in FIG. 1; the NFC plug-in cover part being shown at 14.

The Connector Pad 16 acts as a switch, to connect the music source to the remote speakers 18. The Connector Pad in one form is a solid object of a size that fits well in the palm of one's hand. It has three internal wireless connectivity networks: NFC, Wi-Fi, and Bluetooth. Once in contact with or in close proximity to the NFC case 14 or NFC-capable mobile device 12, the Connector Pad 16 uses NFC technology to connect to the mobile device, pairing each with the other. Once paired, which happens automatically and very quickly, the Connector Pad 16 immediately uses its Bluetooth mode to communicate wirelessly with the associated speaker or speakers 18. The Connector Pad 16 thus facilitates the handshake between the mobile device and the associated speaker(s) 18, makes sure all past memory information is purged, and assures the ongoing communication between the two devices 10 or 12 and 18. Having done that, the Connector Pad 16 may go into a stand-by mode, conserving power; it also has an option to go into monitoring and surveillance mode. In that mode it silently supervises the quality of the connection and will reconnect if needed. It can also offer features such as automatically muting the music when a phone call is received on an associated mobile phone 10 or 12.

The speaker 18 in the system may be one device or a cluster of several speakers, as in a home theater system. Each speaker is Bluetooth enabled. The present system would provide full compatibility to the Connector Pad and also allows a remote app, as in the mobile phone 10 or 12, to control the sound quality.

Here is an outlined scenario to help understand the interactions, shown in FIG. 2. As the user walks into a room that has the Connector Pad 16, he or she can comfortably relax in a sofa and bring the mobile device 10 or 12 or any other device close to the pad 16. While tapping the pad 16 is not needed, a small touch contact is recommended. This will allow a small light to blink and a beep alert as a positive feedback to ensure that the Step 1 connection is established. One only needs to make sure the NFC case 14 or mobile device 10 or 12 power and speaker 18 power are turned on. If the mobile device is already NFC capable, a case 14 would not be required, so long as the mobile maker allows third party connectivity. Regardless, care must be taken to turn the NFC mode on. The Connector Pad 16, if then in Sleep mode, promptly wakes up when the mobile device 10 or 12 is tapped on it. The communication sequence between the NFC case 14 or mobile device 12 and the Connector Pad 16 involves the following steps and checks:

Is the Connector Pad 16 currently busy with another user? Is someone else in the room already listening to music using the system? While there would be LED lights blinking to indicate that the system is already playing, a "Polite Wait" option is available. If a second or third user taps their device on the Connector Pad, either of two things can happen. An LED light of another color (not shown) starts blinking, to recognize the input from the second user. Then the Connector Pad checks to see the previous user's settings and whether the "Do not disturb" feature is turned on. If it is, the request by the new user will be politely refused; but the request is put on queue. This gesture is similar to preventing someone walking into a room while another is already watching TV or listening to music, picking up the remote control and rudely changing the channel or turning off the music. Options can be set to over-ride the "polite wait" option as well. Administrative control can also assign priorities for access privileges. For example, it can be so set up that an adult in the house always has the highest priority!

If the Speaker 18 is not in use and is available to play, the Connector Pad 16 collects the mobile device's ID for Bluetooth connectivity.

Step 2 is initiated, as in FIG. 3. In Step 2, the Connector Pad 16, after collecting the Mobile device 10 or 12's information, sends a FORGET DEVICE command to the Speaker 18. This wipes away all past communication pairing set ups. This eliminates any conflict and instantly assigns the one-on-one pairing and communication to the current mobile device's Bluetooth connection.

Several speakers, such as 5.1 surround with woofers, sub-woofers, tweeters, etc. may be hooked up, as in FIG. 6. In that case, the Connector Pad 16 will work with a Speaker Command module 20, which as part of the Speaker modules ensures that all Speakers are activated. See FIG. 6. The Remote Control App on iOS or Android will allow user to change Speaker controls like bass, treble, fade, balance etc.

In Step 3, while playing music through the system or providing audio conferencing or the like, the Connector Pad 16 quietly makes sure that the music or speakerphone etc.

connectivity is not lost. See FIG. 4. In an event that connectivity is lost, the Connector Pad wakes up and promptly reconnects the devices to assure minimum disruption to the audio output, as shown in FIG. 5.

Summary of the Video Version

Using similar methods and connection principles as discussed above, this invention also offers a unique way to wirelessly connect and play videos with a simple tap. The requirement would be same as audio. The television 30 must be Bluetooth and Wi-Fi enabled; this will allow the initial switching and authentication to be done using Bluetooth and the streaming of video on Wi-Fi. This is illustrated in FIG. 7. A short description of the connection sequence steps is described below as well.

Connection Sequence Steps—
- Smart phone 12 tap on connector pad 16;
- Connector pad, 16 connects with audio 18 and also connector pad connects with video screen 30;
- For audio or music listening—speaker is directly connected by Bluetooth from smart device;
- For video playing. The streaming occurs through the use of Wi-Fi instead; and
- Connector Pad 16 monitors the quality of connection of audio as well as video modes.

THE PREFERRED EMBODIMENTS

The size of the Connector Pad is such that it can be held in the palm of the hand. The Pad has other accessories which are stackable with the Connector Pad and fully modular. The accessories are easily scalable and expandable. This feature offers many benefits to users as well.

Figure 1:
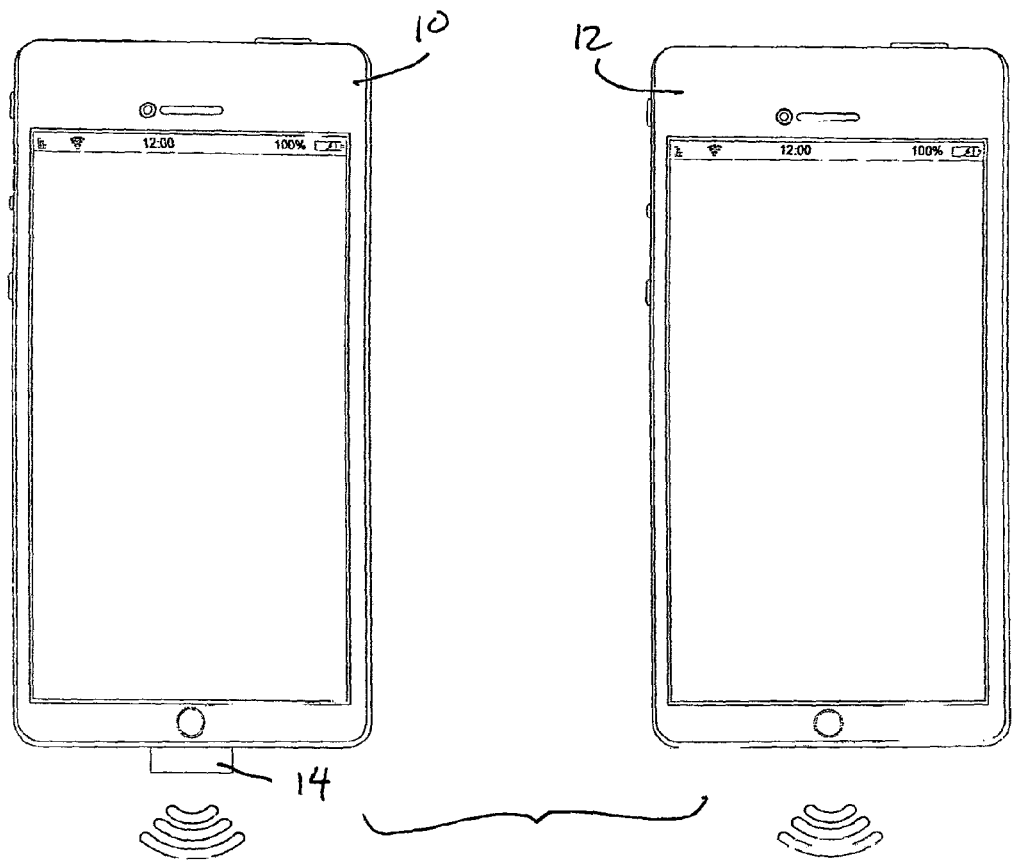
FIG. 1 shows two mobile phones, one with an external adapter case for connectivity and the other with an internal connector.
Figure 2:
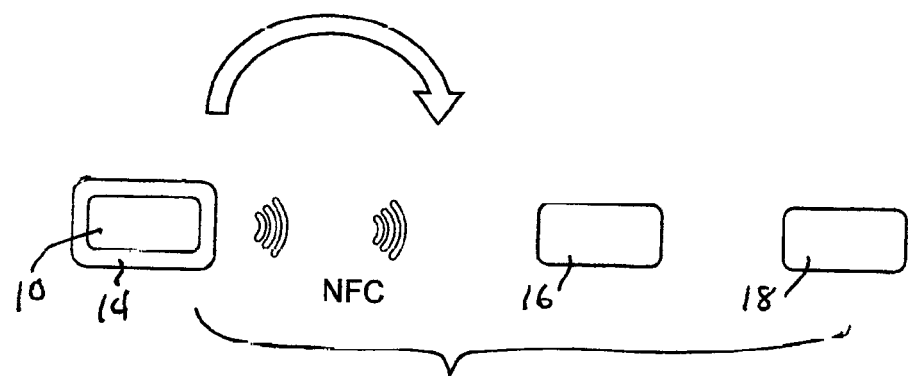
FIG. 2 depicts schematically the steps for NFC pairing between the mobile device and the connector pad.
Figure 3:
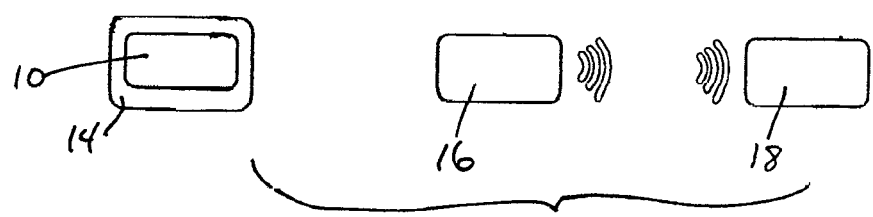
FIG. 3 depicts schematically the steps for Bluetooth system pairing between the mobile device and the connector pad.
Figure 4:
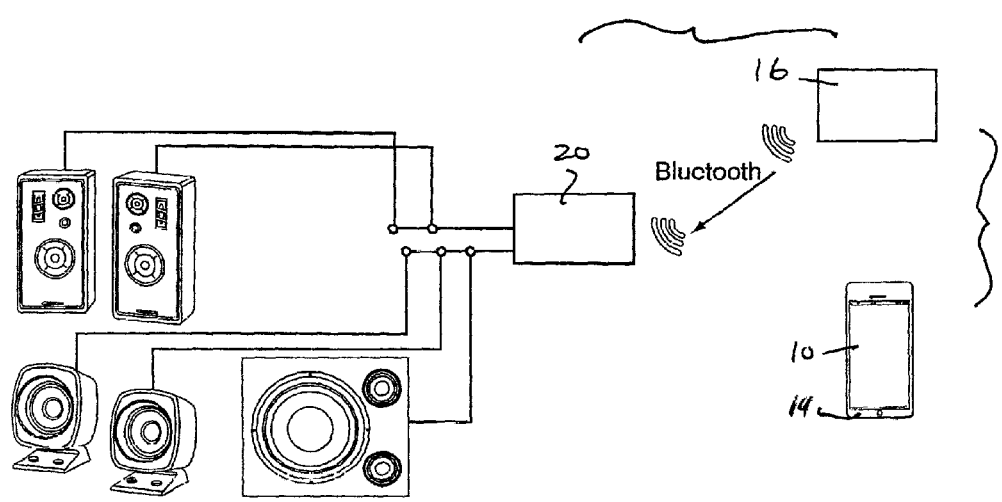
FIG. 4 depicts schematically the connections of the connector pad through a command module where multiple speakers are in use.
Figure 5:
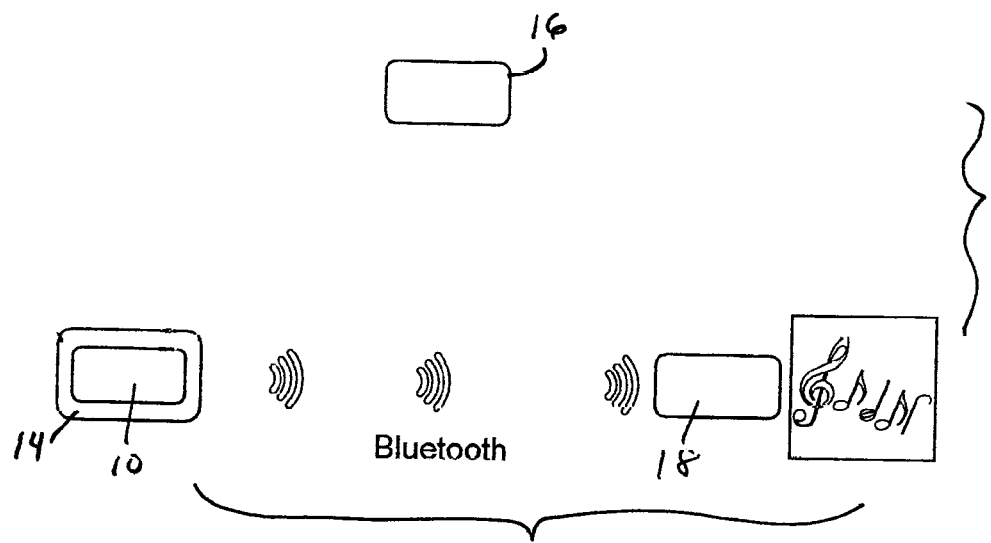
FIG. 5 shows a schematic of the mobile device directly connected via Bluetooth a single speaker, with the connector pad in supervisory mode to ensure quality of the connection.
Figure 6:
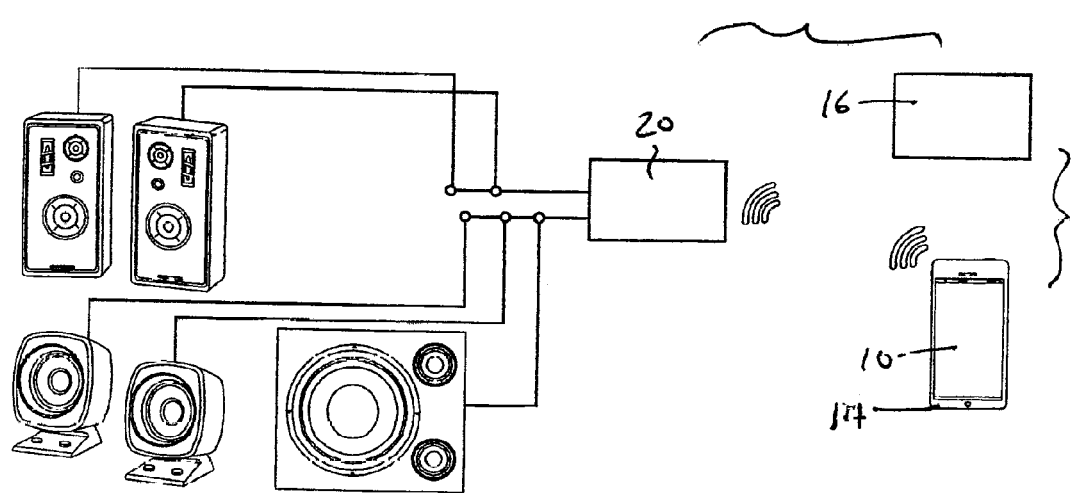
FIG. 6 shows a schematic of the mobile device connected with the command module and multiple speakers.
Figure 7:
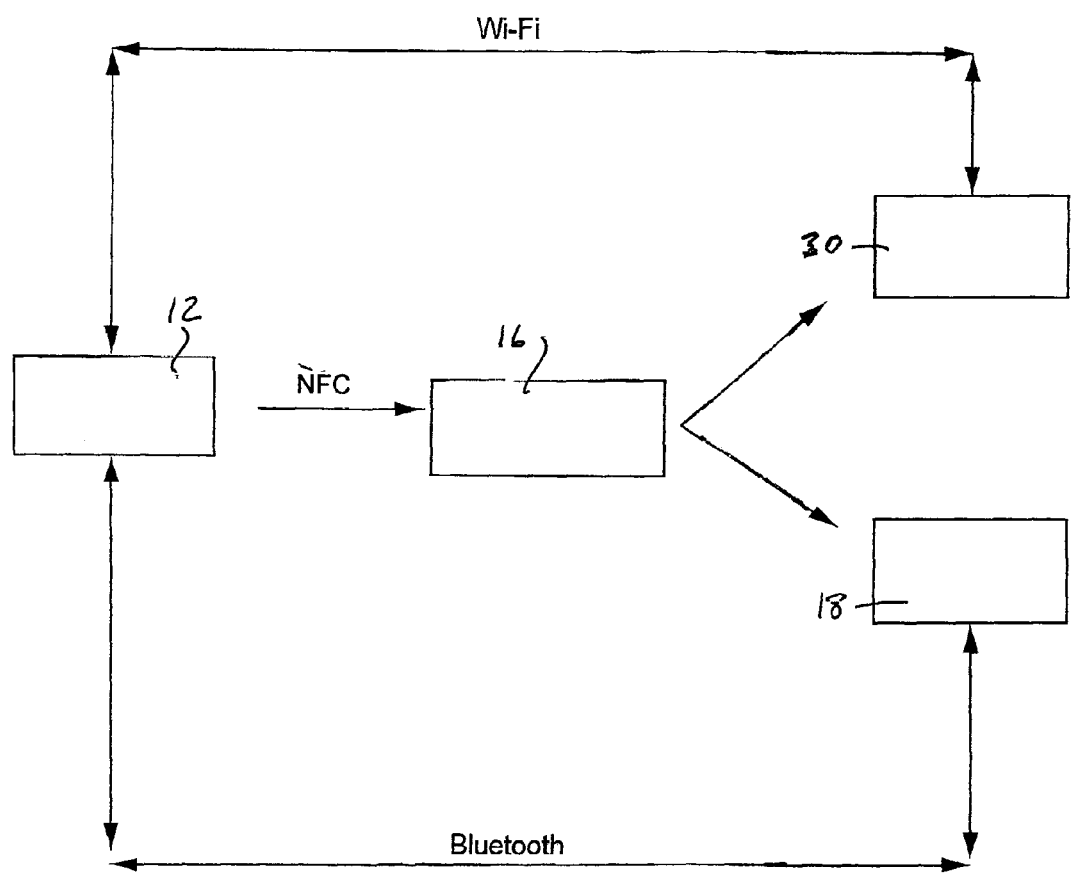
FIG. 7 shows the steps for making a connection of the mobile device through the connector pad to either a TV or an audio speaker.
Figure 8:
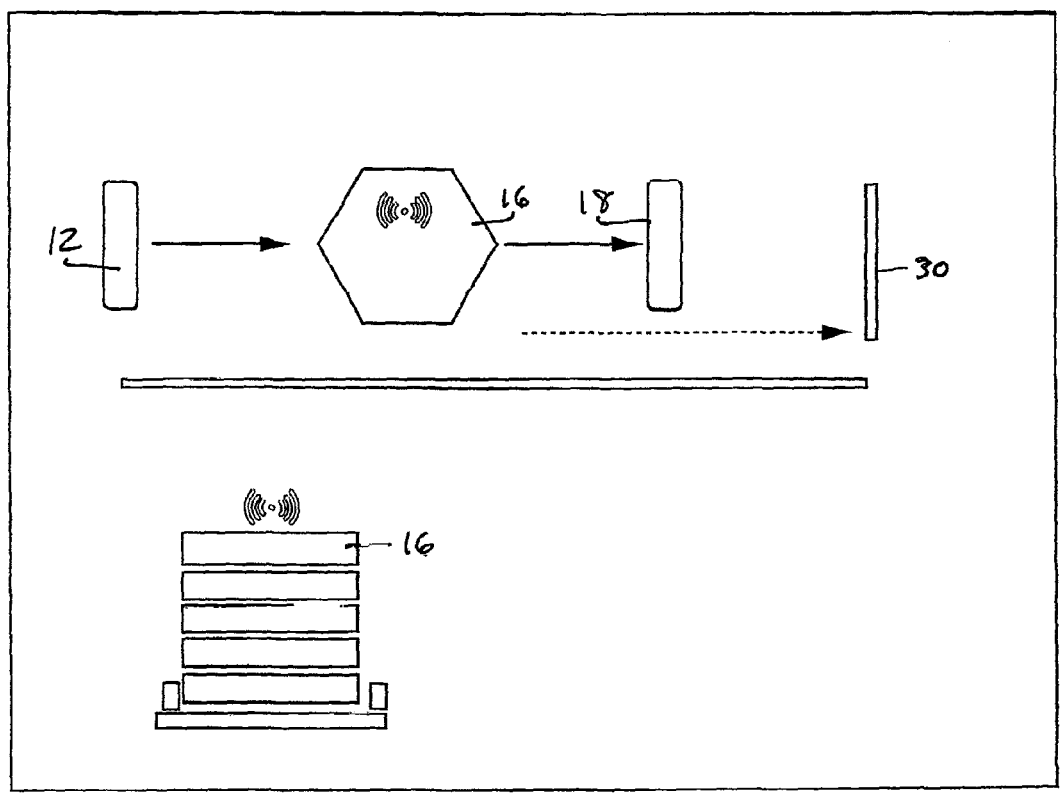
FIG. 8 depicts the configuration of the system with its modular and stackable components.
Figure 9:
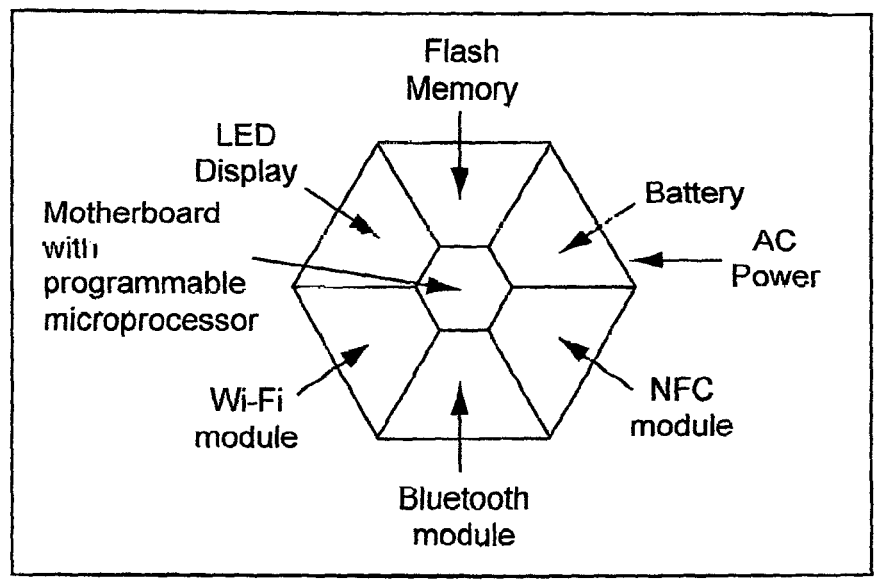
FIG. 9 shows the architecture of the connector pad showing segmentation of the major elements.

List of Accessories
- MediaPad enabled high fidelity speaker(s). The speakers have the MediaPad connectivity module embedded in it. So, the different speaker vendors can advertise as "MediaPad enabled" to gain added market traction
- Smartphone Adapter Casing for specific models that do not support third party access to NFC
- Optional Audio Version Accessories include battery packs for extended life, wireless charger, memory packs for downloaded music (where smartphone or Wi-Fi is unavailable), mini-speakers (for outdoor camping etc. . . . )
- Optional Video Version accessories include memory packs for downloaded movies (where smartphone or Wi-Fi is unavailable) and display panel. This is for situation where the smart mobile device is not available.
- Android and IOS app. The user interface and controls on the App allow the user to set preferences, playlists, etc.
- FIG. 8 summarizes the entire system configuration under both conditions. 1) when the source mobile device and the desired external Speakers are available (upper window), and 2) when Wi-Fi or when the source mobile equipment or the external speaker is unavailable
- FIG. 9 illustrates the Connector Pad architecture. The figure shows how the different elements are nested inside one single solid device as one single integral unit.

The benefits reach not only to consumers for their leisure and entertainment at home, but they extend to other spaces and environments as well. This invention can offer businesses in the travel, transportation, and hospitality industries an edge over their competitors. This is mainly due to the following key features this invention offers:
- Hassle free connection and uninterrupted listening. Automatic re-connection is an optional feature, for when the connection is dropped;
- Able to connect with multiple users;
- Security and privacy of personal data; and
- Does not require any technical skills or aptitude to enjoy the benefits.

In the previous sections, it was described in detail how the connection is easy and hassle free. Reference is made to the PoliteWait option and ability to manage multiple users.rivacy and Data Security An important and key benefit is the security and privacy aspect. Mobile devices not only have music and videos stored in them but also have large amount of personal data.

Current speaker devices with Bluetooth are configured to directly access people's mobile devices. The user is exposed to the threat of a virus corrupting the mobile data or even risk of other personal information being extracted inadvertently.

The Connector Pad of the MediaPad offers an effective firewall and selectively accesses just the needed data for making a connection. The owner of the Connector Pad can choose not to use public Connector Pads and use his or hers instead. Even if a public Connector Pad is chosen, user data is secured and not allowed to be transmitted to any external device. Especially when someone hires a rental car, checks into a hotel room, or listens to music from a hospital bed, etc. the data privacy issue becomes very important. People are reluctant to synchronize their mobile devices to the Bluetooth device of the rental cars; fearing that the entire personal data in the mobile device could be transferred without the individual's knowledge or consent. MediaPad offers an effective firewall.

Some examples of use are as follows:
a) Personal home use.
b) Use in hotel rooms. Just tap into Connector Pads placed in bedside tables to connect to hotel speakers and television. User can choose to use his or her own Connector Pad as well.
c) Use in rental cars. Users can rent cars that are MediaPad enabled. Either they can rent the Connector Pad (like they do with GPS systems) or bring their own Connector Pad and plug into the automobile's entertainment system.

Either way, their data us secured and not compromised.
d) Use in hospitals. Patients can enjoy music or video with a simple tap. Simplified connection is very appealing to people who are still unwell; this system allows them not to depend on others.
e) Use in business settings for audio conferences and video conferences. No need to buy expensive audio conferencing speaker phones or video conferencing monitors. The App can be used to connect to multiple parties.
f) Works with headphones and ear phones as well that are Bluetooth enabled.

Many variations may be made in the invention as shown and its manner of use, without departing from the principles of the invention as described herein and/or as claimed as our invention. Minor variations will not avoid the use of the invention.

I claim as my invention:

1. A method for making a quick wireless connection between a smart mobile device and an external audio speaker or video display system comprising:
   providing a handheld touch enabled multi-purpose connector pad comprising a programed processor and memory and wireless communication modules;
   positioning the connector pad proximate a smart mobile device and an external audio speaker or video display system to enable a hassle-free connection while maintaining a safe, secure and uninterrupted streaming of audio or video data for multiple users, the connector pad being programmed to:
   (a) determine if a user taps the connector pad, and responsive thereto initiating a pairing routine for pairing the smart mobile device to the audio speaker or video display system,
   (b) the pairing routine providing a wireless pairing between the smart mobile device and the connector pad, the connector pad then communicating wirelessly with the audio speaker or video display system to clear memory or prior retained information to resolve device conflicts, and facilitating a handshake connection between the smart mobile device and the external audio speaker or video display system to establish pairing of the smart mobile device directly to the external audio speaker or video display system,
   (c) once the pairing is established, allowing direct streaming from the smart mobile device to the external audio speaker or video display system, and the connector pad going into a standby and supervisor mode.

2. The method of claim 1, wherein the connector pad stores connection data and transmits on demand, using NFC activation, such connection data for connecting the smart mobile device to the audio speaker or video display system.

3. The method of claim 2, wherein the connector pad uses Bluetooth® technology to connect with the smart mobile device or the audio speaker oft video display system.

4. The method of claim 2, wherein the connector pad uses NFC technology to connect with the smart mobile device.

5. The method of claim 2, wherein the connector pad uses Wi-Fi wireless technology to connect with the smart mobile device or the audio speaker or video display system.

6. The method of claim 1, wherein the connection between the smart mobile device and the external audio speaker or video display system is alternatively made as soon as the smart mobile device comes within a short distance of the connector pad.

7. The method of claim 2, wherein the connector pad operates as a firewall and uses only data required to facilitate the handshake.

8. The method of claim 1, wherein the connector pad continues to monitor and supervise the quality of audio and/or video streaming; and starts a reactivation routine as soon as it senses a disruption or a loss in connectivity.

9. The method of claim 1, wherein the connector pad stores programming knowledge to manage multiple user requests and establish priority and privileges as established by one of an owner and an administrator of the device.

10. The method of claim 1, wherein the connector pad stores programming information to modulate and manage the communication mechanism between the connector pad and the smart mobile device and also with the external audio speaker or video display system, using required communication protocols.

11. A system for making a quick wireless connection between a smart mobile device and an external audio speaker or video display system comprising:
    a handheld touch enabled multi-purpose connector pad comprising a programed processor and memory and wireless communication modules the connector pad being programmed to:
    (a) determine if a user taps the connector pad, and responsive thereto initiating a pairing routine for pairing the smart mobile device to the audio speaker or video display system,
    (b) the pairing routine providing a wireless pairing between the smart mobile device and the connector pad, the connector pad then communicating wirelessly with the audio speaker or video display system to clear memory or prior retained information to resolve device conflicts, and facilitating a handshake connection between the smart mobile device and the external audio speaker or video display system to establish pairing of the smart mobile device directly to the external audio speaker or video display system, and
    (c) once the pairing is established, allowing direct streaming from the smart mobile device to the external audio speaker or video display system, and the connector pad going into a standby and supervisor mode.

12. The system of claim 11, wherein the connector pad stores connection data and transmits on demand, using NFC activation, such connection data for connecting the smart mobile device to the audio speaker or video display system.

13. The system of claim 12, wherein the connector pad uses Bluetooth® technology to connect with the smart mobile device or the audio speaker or video display system.

14. The system of claim 12, wherein the connector pad uses NFC technology to connect with the smart mobile device.

15. The system of claim 12, wherein the connector pad uses Wi-Fi wireless technology to connect with the smart mobile device or the audio speaker or video display system.

16. The system of claim 11, wherein the connection between the smart mobile device and the external audio speaker or video display system is alternatively made as soon as the smart mobile device comes within a short distance of the connector pad.

17. The system of claim 12, wherein the connector pad operates as a firewall and uses only data required to facilitate the handshake.

18. The system of claim 11, wherein the connector pad continues to monitor and supervise the quality of audio and/or video streaming; and starts a reactivation routine as soon as it senses a disruption or a loss in connectivity.

19. The system of claim 11, wherein the connector pad stores programming knowledge to manage multiple user requests and establish priority and privileges as established by one of an owner and an administrator of the device.

20. The system of claim 11, wherein the connector pad stores programming information to modulate and manage the communication mechanism between the connector pad and the smart mobile device and also with the external audio speaker or video display system, using required communication protocols.

* * * * *